United States Patent
Zhang et al.

(10) Patent No.: US 12,314,257 B2
(45) Date of Patent: May 27, 2025

(54) DATA MATCHING DEVICE AND DATA MATCHING METHOD

(71) Applicants: DIGIWIN CO., LTD, Shanghai (CN); DATA SYSTEMS CO., LTD., New Taipei (TW)

(72) Inventors: Tuo Zhang, Shanghai (CN); Guoxin Sun, Shanghai (CN)

(73) Assignees: DIGIWIN CO., LTD, Shanghai (CN); DATA SYSTEMS CO., LTD., New Taipei (TW)

( * ) Notice: Subject to any disclaimer, the term of this patent is extended or adjusted under 35 U.S.C. 154(b) by 92 days.

(21) Appl. No.: 18/173,806

(22) Filed: Feb. 24, 2023

(65) Prior Publication Data
US 2024/0220491 A1    Jul. 4, 2024

(30) Foreign Application Priority Data
Dec. 29, 2022    (CN) .......................... 202211707788.0

(51) Int. Cl.
*G06F 16/245* (2019.01)
*G06F 16/28* (2019.01)

(52) U.S. Cl.
CPC .......... *G06F 16/245* (2019.01); *G06F 16/288* (2019.01)

(58) Field of Classification Search
CPC .. G06F 16/1794; G06F 16/245; G06F 16/254; G06F 16/258; G06F 16/288
See application file for complete search history.

(56) References Cited

U.S. PATENT DOCUMENTS

| | | | | |
|---|---|---|---|---|
| 2015/0186404 A1* | 7/2015 | Carvalho | .............. | G06F 16/254 707/694 |
| 2016/0171399 A1* | 6/2016 | Santhanam | ............ | G06Q 40/12 705/7.36 |
| 2018/0330723 A1* | 11/2018 | Acero | ..................... | G10L 15/30 |

* cited by examiner

*Primary Examiner* — James E Richardson
(74) *Attorney, Agent, or Firm* — JCIPRNET

(57) ABSTRACT

The disclosure provides a data matching device and a data matching method. The data matching device includes a storage device and a processor. The storage device is configured to store a matching module and a data package module. The processor is coupled to the storage device and configured to receive raw data. The processor executes the data package module to generate structured and packaged data according to the raw data. The processor executes the matching module to match the structured and packaged data to a corresponding task logic. The data matching device and the data matching method in the disclosure may automatically perform data package and task matching.

10 Claims, 5 Drawing Sheets

DATA MATCHING DEVICE AND DATA MATCHING METHOD

CROSS-REFERENCE TO RELATED APPLICATION

This application claims the priority benefit of China application serial no. 202211707788.0, filed on Dec. 29, 2022. The entirety of the above-mentioned patent application is hereby incorporated by reference herein and made a part of this specification.

BACKGROUND

Technical Field

The disclosure relates to a data processing technology, more particularly, to a data matching device and a data matching method.

Description of Related Art

Conventional business logic is a set of fixed processes that are manually arranged, and each of execution steps is required to implement a new set of logic based on a model. Therefore, the conventional business process processing has problems of heavy workload and high difficulty, and does not achieve a good reuse effect.

SUMMARY

The disclosure relates to a data matching device and a data matching method, which may automatically perform data package and task matching according to a data matching request.

According to an embodiment of the disclosure, a data matching device in the disclosure includes a storage device and a processor. The storage device is configured to store a matching module and a data package module. The processor is coupled to the storage device and configured to receive raw data. The processor executes the data package module to generate structured and packaged data according to the raw data. The processor executes the matching module to match the structured and packaged data to a corresponding task logic.

According to an embodiment of the disclosure, a data matching method in the disclosure includes the following. Raw data is received through a processor. A data package module is executed through the processor to generate structured and packaged data according to the raw data. A matching module is executed through the processor to match the structured and packaged data to a corresponding task logic.

Based on the above, in the data matching device and the data matching method of the disclosure, the raw data may be automatically converted into the structured and packaged data, and may be matched to the corresponding task logic.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
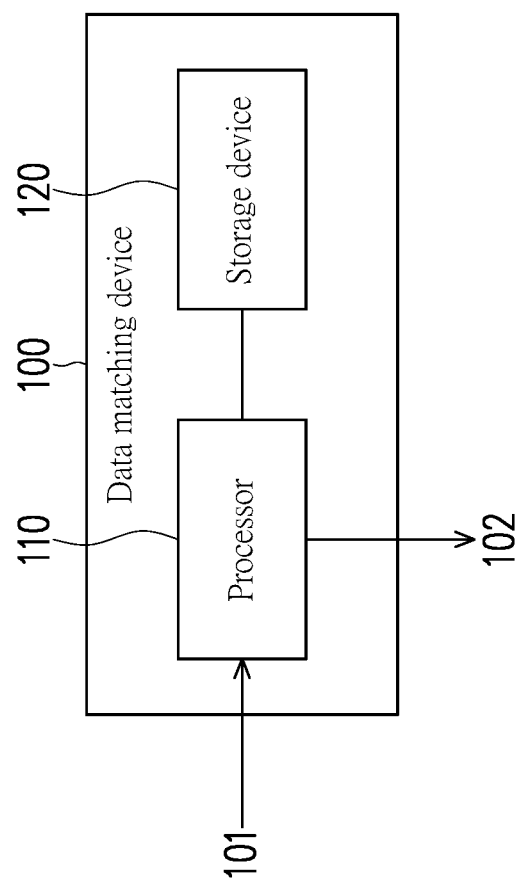
FIG. 1 is a schematic circuit diagram of a data matching device according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

Firstly, a data matching device and a data matching method in the disclosure may simplify difficulty and complexity of a design of a business processing flow and improve reusability. Raw data described in various embodiments of the disclosure may be, for example, material information in manufacturing, bills in finance, leave application forms in a leave process, etc. The information may be abstractly defined as the raw data, and includes data content such as a data type, a status, and features. In addition, there will be a series of corresponding process logics for different types of raw data in different states. Therefore, in the disclosure, the logics may be packaged as tasks. When a data process package is performed, only the data to be processed (i.e. structured and packaged data) is required to defined, and the data matching device in the disclosure may automatically recommend the appropriate process logic (i.e. a task logic) for the matching thereof. In this way, the complexity of package of the business processing flow may be greatly simplified, and the reusability may be improved. In addition, the appropriate task logic may be dynamically matched for processing according to data changes at runtime.

FIG. 1 is a schematic circuit diagram of a data matching device according to an embodiment of the disclosure. Referring to FIG. 1, a data matching device 100 includes a processor 110 and a storage device 120. The processor 110 is coupled to the storage device 120. The data matching device 100 may further include an input device having actual circuit elements, a user interface, a communication interface, a data transmission interface, etc., so that the processor 110 may receive an instruction or a signal of a matching request from a data source or an external device or according to a user operation. In this embodiment, the data matching device 100 may be, for example, a personal computer, a workstation computer, or other electronic devices having data computing capabilities. In an embodiment, the data matching device 100 may also be integrated in a cloud server or a private server inside an enterprise. In an embodiment, the data matching device 100 may be used, for example, to implement an enterprise resource planning (ERP) system, and may execute multiple application programming interfaces (APIs), so as to call multiple business task modules. In an embodiment, the business task module refers to the task logic (or a program) used to perform specific business functions according to business data, for example, the task logic that may be used to perform a function of generating a purchase order based on purchase data, or for example, the task logic that may be used to perform a function of generating a purchase requisition based on purchase requisition data. However, the disclosure is not limited thereto.

In this embodiment, the processor 110 of the data matching device 100 may include, for example, a central processing unit (CPU), other programmable general-purpose or special-purpose microprocessors, a digital signal processor (DSP), an application specific integrated circuit (ASIC), a programmable logic device (PLD), other similar processing circuits, or a combination of these devices.

In this embodiment, the storage device 120 may implement a remote cloud storage service or a local data storage service. The storage device 120 may include a memory and/or a database. The memory may be, for example, a non-volatile memory (NVM). The storage device 120 may store relevant programs, modules, systems, or algorithms used to implement each of the embodiments of the disclosure, so as to be accessed and executed by the processor 110 to implement the relevant functions and operations described in each of the embodiments of the disclosure. The storage device 120 may further be used, for example, to cache the structured and packaged data described in each of the embodiments of the disclosure.

Figure 2:
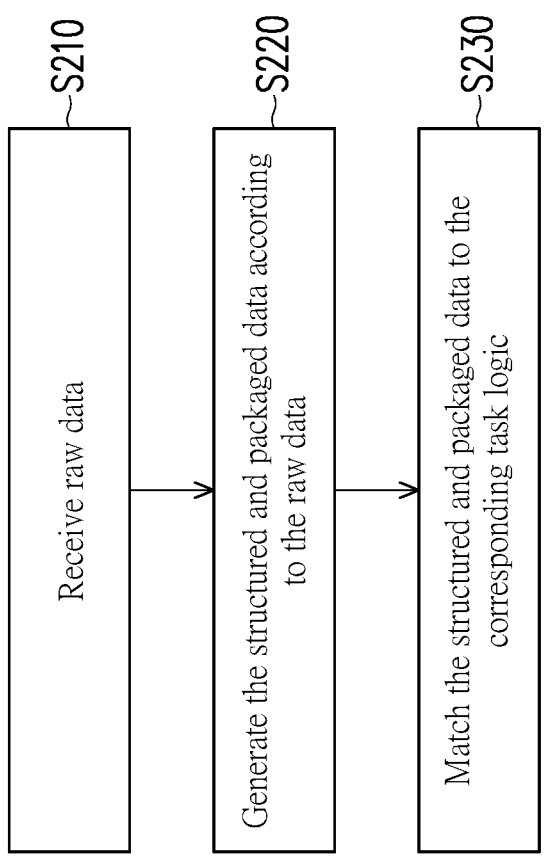
FIG. 2 is a flowchart of a data matching method according to an embodiment of the disclosure.

FIG. 2 is a flowchart of a data matching method according to an embodiment of the disclosure. Referring to FIGS. 1 and 2, the data matching device 100 may perform the following steps S210 to S230. In step S210, the processor 110 may receive raw data 101. In this embodiment, the processor 110 of the data matching device 100 may receive the raw data 101 from the data source. For this, the data source may be, for example, the raw business data or data obtained through the application programming interface. In addition, the raw data 101 may also be data generated by certain sensors and specific data processing, environmental information, artificial settings, etc. In step S220, the processor 110 may generate the structured and packaged data according to the raw data 101. In this embodiment, the structured and packaged data means that certain transactions in a real world may be mapped into a digital domain to be packaged into the data. In this embodiment, the structured and packaged data may include a record data type field, a data feature field, and a raw data field (the fields are described and implemented by language of a corresponding coding program). In this embodiment, the structured and packaged data may also include other information such as recorded environmental information. In step S230, the processor 110 may match the structured and packaged data to the corresponding task logic. In this embodiment, the task logic refers to an algorithm or logic that may process the structured and packaged data, and the task logic may define a range of the data that may be processed by itself.

Figure 3:
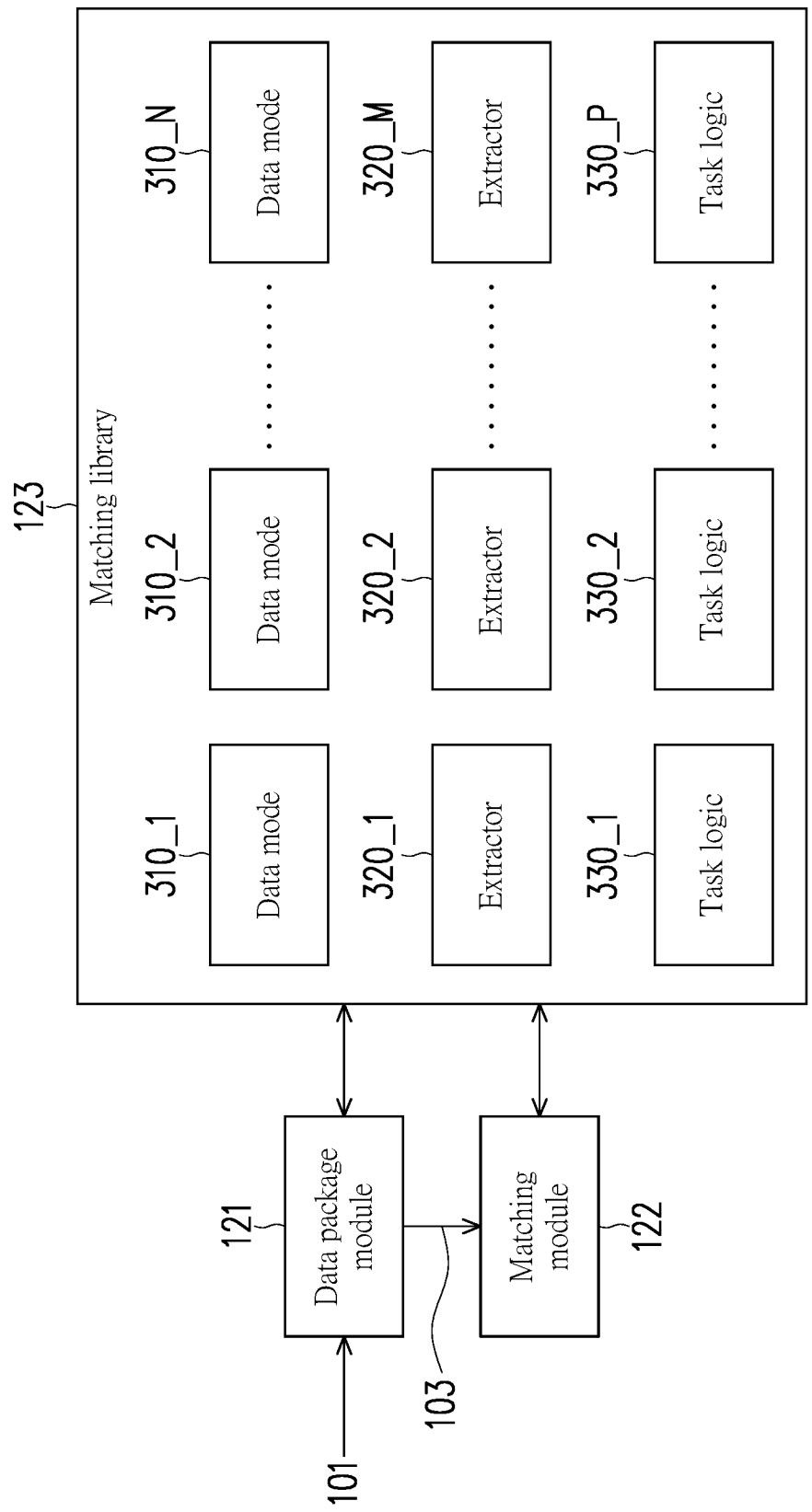
FIG. 3 is a schematic diagram of multiple modules of an embodiment of the disclosure.

FIG. 3 is a schematic diagram of multiple modules of an embodiment of the disclosure. Referring to FIGS. 1 and 3, in this embodiment, the storage device 120 may store a data package module 121, a matching module 122, and a matching library 123. The matching library 123 may further include storing multiple data models 310_1 to 310_N, multiple (data) extractors 320_1 to 320_M, and multiple task logics 330_1 to 330_P, where N, M, and P are positive integers respectively. In this embodiment, the processor 110 may execute the data package module 121 to execute the corresponding extractor and generate structured and packaged data 103 according to the corresponding data model. The processor 110 may find the suitable extractor and the corresponding data model from the predefined extractors 320_1 to 320_M according to an original field or raw data information recorded in the raw data 101. In this embodiment, the extractors 320_1 to 320_M may be respectively used to define how to perform data package and extraction of data features and/or environment information on the raw data according to the corresponding data model.

For example, the raw data 101 may be original purchase order data, and may correspond to the extractor 320_2. The extractor 320_2 may be preset to establish a data structure of the structured and packaged data 103 according to the corresponding data model 310_2, and may further implement the data processing and computation such as total amount calculation or total price calculation according to the purchase order data, so as to generate data of a total amount calculation result or a total price calculation result to be recorded in a data feature field of the structured packaged data 103.

In this embodiment, the processor 110 may then execute the matching module 122 to perform task matching on the structured and packaged data 103. The task logics 330_1 to 330_P may respectively define fields with basic information, an execution logic, matching definition information, etc. The matching definition may further include data matching information, condition matching information, and tag matching information. The data matching information may, for example, include receipt information and a data status. The data matching information may define a range of the data types and states that this task may handle. The condition matching information may define conditions that the data is required to satisfy, and when matching, the features in the data, environmental information, etc., and the conditions on the task are used for matching. The tag matching information may define some tags, such as whether this task may handle urgent scenarios, applicable fields, etc., and may be matched through the tags in the task logics and the features and environmental information in the data (the data features and the environmental information may be understood as data tags here), so that a matching degree of this task to the current data may be calculated.

For example, the structured and packaged data 103 may be matched to the task logic 330_3. The structured and packaged data 103 may have the highest matching degree with the task logic 330_3. The structured and packaged data 103 may be input to the task logic 330_3, so that the task logic 330_3 may generate corresponding output data. The task logic 330_3 may be used, for example, to generate a new purchase order data or product production data for satisfying the purchase order. In this embodiment, the task logics 330_1 to 330_P may be different business logics, and are used to process different business tasks (such as converting the purchase requisition to the purchase order, generating the leave application form, etc.). The output data is the business data.

Figure 4:
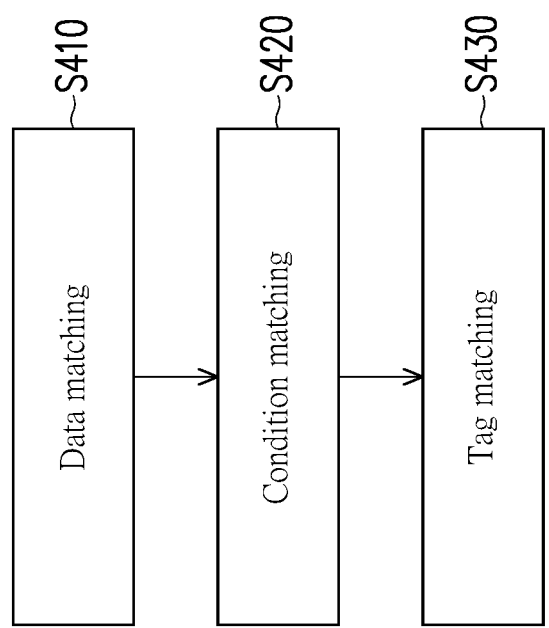
FIG. 4 is a flowchart of a matching operation according to an embodiment of the disclosure.

FIG. 4 is a flowchart of a matching operation according to an embodiment of the disclosure. Referring to FIGS. 1 to 4, the above step S230 may further include the following steps S410 to S430. In step S410, the matching module 122 may perform data type matching. The matching module 122 may perform matching according to data feature information in the structured and packaged data 103 to compare the data matching information of the task logics 330_1 to 330_P respectively, so as to determine a portion of the task logics 330_1 to 330_P that has the same document type and/or data status as the structured and packaged data 103. Then, in step S420, the matching module 122 may perform the condition matching information to further compare the condition matching information of the task logic that satisfies the data matching, so as to determine whether the condition satisfying the task logic of the data type matching match with the data feature of the structured and packaged data 103. Finally, in step S430, the matching module 122 may perform tag matching. The tag matching may include calculating a degree of matching (the matching degree) between the structured and packaged data 103 and the task logic that satisfies the data matching and condition matching to select the task logic with the highest matching degree, so as to complete the process package or further input the structured and packaged data 103 to the task logic with the highest matching degree to generate the corresponding output data.

Figure 5:
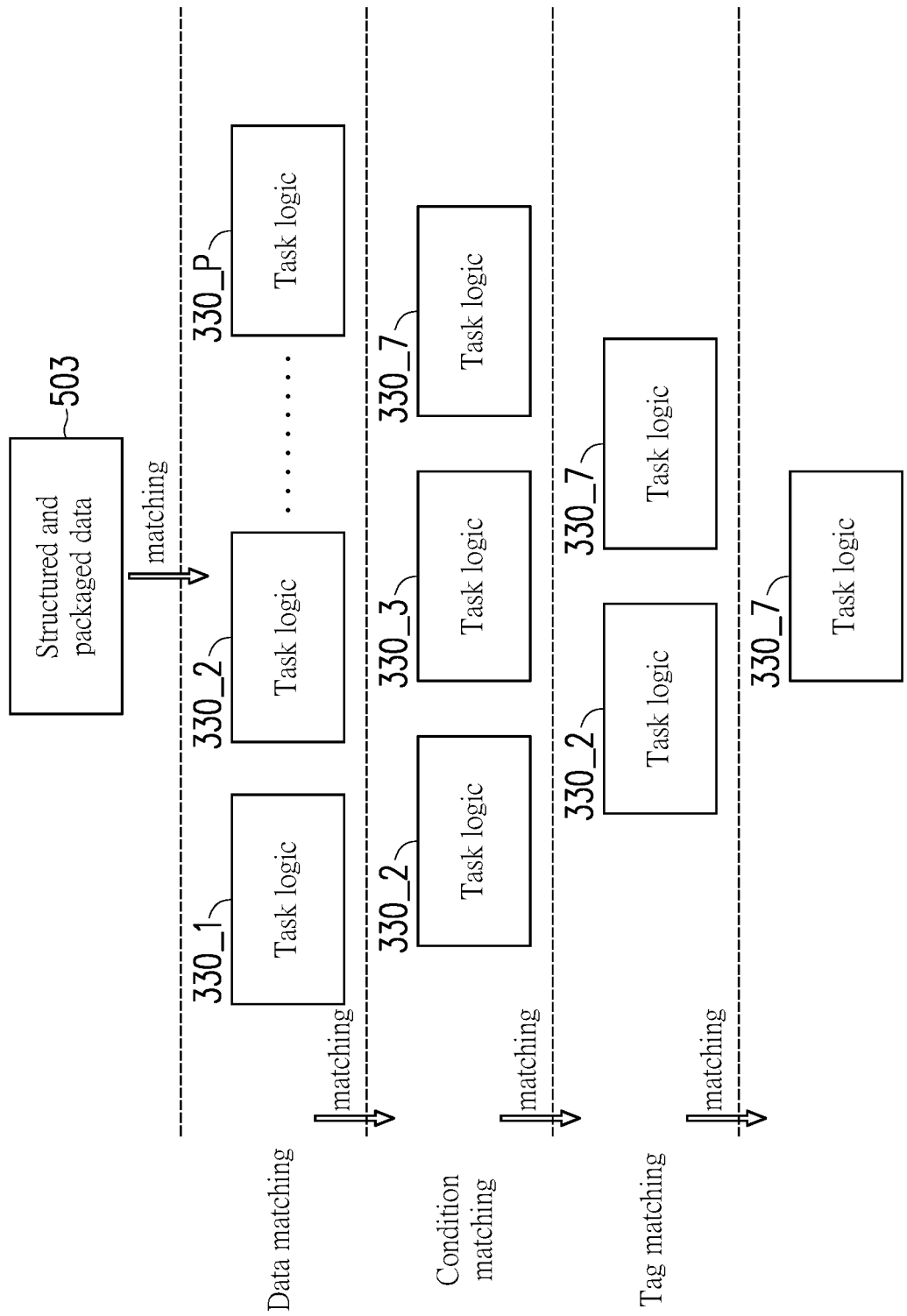
FIG. 5 is a schematic diagram of a matching operation according to an exemplary embodiment of the disclosure.

FIG. 5 is a schematic diagram of a matching operation according to an exemplary embodiment of the disclosure. Referring to FIGS. 1 to 5, for example, structured and packaged data 503 may record a field content of {requisitionBill.state1 (price: 101, num:5, tag1:value1)}. The matching module 122 may first perform the data matching to compare the data types of the task logics 330_1 to 330_P respectively. For this, the task logics 330_2, 330_3, and 330_7 may all have the same data type and state of {requisitionBill.state1} as the structured and packaged data 503. Next, the matching module 122 may perform the condition matching information to compare whether the conditions of the task logics 330_2, 330_3, and 330_7 match with the structured and packaged data 503. For this, the task logic 330_2 may, for example, record a field with a condition of (${price}>100). The task logic 330_3 may, for example, record a field with a condition of (${price}>3). The task logic 330_7 may, for example, record a field with a condition of (${price}m<100). Therefore, the matching module 122 may determine that the task logic 330_2 and the task logic 330_7 may match with a condition of (price: 101} of the structured and packaged data 503. Then, the matching module 122 may perform the tag matching. For this, the task logic 330_2 may, for example, record a field of a tag of (tag1:value2). The task logic 330_7 may, for example, record a field of a tag of (tag1:value1). Therefore, since the tag of (tag1:value1) of the task logic 330_7 is the same as the tag (tag1:value1) of the structured and packaged data 503, the matching module 122 may calculate that the task logic 330_7 has the highest matching degree. In this way, the processor 110 may combine the structured and packaged data 503 with the task logic 330_7 to implement the process package or further input the structured and packaged data 503 to the task logic 330_7 to generate the corresponding output data.

Therefore, in the data matching device and the data matching method of the disclosure, the raw data can convert into the structured and packaged data, and then the task matching may be performed according to the structured and packaged data to obtain the corresponding task logic, which may be used for the package of the data processing flow or may dynamically match the appropriate task logic for processing during the process of data processing flow.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A data matching device, comprising:
a storage device configured to store a matching module, a data package module and a matching library, wherein the matching library comprises a plurality of task logics, a plurality of extractors, and a plurality of data models;
an input device with an interface to receive instructions; and
a processor coupled to the storage device and configured to:
receive a matching request through the input device;
receive raw data through the input device;
execute the data package module by selecting a corresponding extractor from the plurality of extractors and a corresponding data model from the plurality of data models according to an original field or raw data information recorded in the raw data, and generating structured and packaged data according to the corresponding data model,
wherein the plurality of extractors indicates how to perform data package and data extraction according to the corresponding data model;
execute the matching module to match the structured and packaged data to a corresponding task logic by performing data type matching, condition matching, and tag matching on the structured and packaged data; and
execute the task logic according to the structured and packaged data to generate output data,
wherein the output data is business data and is used to perform business operations.

2. The data matching device according to claim 1, wherein the structured and packaged data records a data type field, a data feature field, and a raw data field.

3. The data matching device according to claim 1, wherein the tag matching comprises calculating a matching degree between the structured and packaged data and the corresponding task logic.

4. The data matching device according to claim 1, wherein the task logic comprises an execution logic, basic information, and matching definition information.

5. The data matching device according to claim 1, wherein the task logic is a business logic.

6. A data matching method, comprising:
receiving a matching request through a processor;
receiving raw data through the processor;
executing a data package module by selecting a corresponding extractor from a plurality of extractors and a corresponding data model from a plurality of data models according to an original field or raw data information recorded in the raw data and generating structured and packaged data according to the corresponding data model through the processor,
wherein the plurality of extractors indicates how to perform data package and data extraction according to the corresponding data model;
executing a matching module through the processor to match the structured and packaged data to a corresponding task logic by performing data type matching, condition matching, and tag matching on the structured and packaged data; and
executing the task logic according to the structured and packaged data to generate output data,
wherein the output data is business data and is used to perform business operations.

7. The data matching method according to claim 6, wherein the structured and packaged data records a data type field, a data feature field, and a raw data field.

8. The data matching method according to claim 6, wherein the tag matching comprises calculating a matching degree between the structured and packaged data and the corresponding task logic.

9. The data matching method according to claim 6, wherein the task logic comprises an execution logic, basic information, and matching definition information.

10. The data matching method according to claim 6, wherein the task logic is a business logic.

* * * * *